United States Patent
Basheer et al.

(10) Patent No.: US 12,516,428 B1
(45) Date of Patent: Jan. 6, 2026

(54) METHOD OF ELECTROCHEMICALLY FORMING METHANOL

(71) Applicant: KING FAHD UNIVERSITY OF PETROLEUM AND MINERALS, Dhahran (SA)

(72) Inventors: Chanbasha Basheer, Dhahran (SA); Muhammad Mustapha Adam, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/003,246

(22) Filed: Dec. 27, 2024

(51) Int. Cl.
| | |
|---|---|
| C25B 3/07 | (2021.01) |
| C25B 3/23 | (2021.01) |
| C25B 11/052 | (2021.01) |
| C25B 11/056 | (2021.01) |
| C25B 11/065 | (2021.01) |
| C25B 11/077 | (2021.01) |

(52) U.S. Cl.
CPC ............. *C25B 11/052* (2021.01); *C25B 3/07* (2021.01); *C25B 11/056* (2021.01); *C25B 11/065* (2021.01); *C25B 11/077* (2021.01)

(58) Field of Classification Search
CPC ............ C25B 3/07; C25B 3/23; C25B 11/065
USPC ........................................................ 205/452
See application file for complete search history.

(56) References Cited

U.S. PATENT DOCUMENTS

| | | | |
|---|---|---|---|
| 9,499,917 B2 * | 11/2016 | Fan | .......................... C25B 13/02 |
| 11,898,258 B2 | 2/2024 | Korin et al. | |
| 2023/0193489 A1 | 6/2023 | Matsumoto et al. | |

FOREIGN PATENT DOCUMENTS

CN 112108185 A 12/2020

OTHER PUBLICATIONS

Lee et al., "High-Efficiency Electrochemical Methane Conversion Using Fe2O3-Based Catalysts Assisted by Thermochemical Active Oxygen," Applied Catalysis B: Environment and Energy (May 5, 2024), vol. 344, pp. 1-9. (Year: 2024).*

Victoria A. Maia, et al., "Methane to Methanol Conversion Using Proton-Exchange Membrane Fuel Cells and PdAu/Antimony-Doped Tin Oxide Nanomaterials", Methane, vol. 2, No. 3, Jun. 25, 2023, pp. 252-264.

Bunyarat Rungtaweevoranit, et al., "Structural Evolution of Iron-Loaded Metal-Organic Framework Catalysts for Continuous Gas-Phase Oxidation of Methane to Methanol", ACS Applied Materials & Interfaces, vol. 15, May 23, 2023, pp. 26700-26709.

* cited by examiner

*Primary Examiner* — Edna Wong
(74) *Attorney, Agent, or Firm* — Oblon, McClelland, Maier & Neustadt, L.L.P.

(57) ABSTRACT

A method of electrochemically forming methanol from methane using a fuel cell. The fuel cell includes an anode chamber including an anode including a catalyst that includes carbon-doped γ-$Fe_2O_3$ nanoparticles disposed on a graphite felt support and an anode solution including water and methane, a cathode chamber including a cathode and a cathode solution including water, and a proton exchange membrane separating the anode chamber and the cathode chamber. The method includes supplying methane to the anode, applying a voltage to the fuel cell, and collecting methanol from the anode solution.

20 Claims, 7 Drawing Sheets

METHOD OF ELECTROCHEMICALLY FORMING METHANOL

CROSS-REFERENCE TO RELATED APPLICATION

The present disclosure claims the benefit of Saudi Patent Application No. 1020246997 filed on Dec. 10, 2024, with the Saudi Authority for Intellectual Property Office, which is incorporated herein by reference in its entirety.

BACKGROUND

Technical Field

The present disclosure is directed to an electrochemical method for synthesizing methanol using carbon-doped $\gamma\text{-Fe}_2\text{O}_3$ nanoparticles in a fuel cell.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Methane ($CH_4$) is a major greenhouse gas, about 80 times more effective than carbon dioxide ($CO_2$) at trapping heat in the past two decades. Approximately 10% of methane is released into the environment, with 1% coming from petroleum industries through gas flaring. To mitigate this impact, the petrochemical industry has focused on converting methane into valuable chemicals.

Traditionally, methane conversion involves a two-step process: oxidation to synthesis gas (syngas) followed by catalytic reduction to methanol, which is costly and energy intensive. Direct electrocatalytic conversion of methane to methanol offers a more sustainable alternative but faces challenges, including the inertness of methane's C—H bonds and issues with selectivity and scalability. Fischer-Tropsch synthesis (FTS) is a conventional process that converts carbon monoxide (CO) and hydrogen ($H_2$) into hydrocarbons and alcohols, including methanol, typically using high temperatures and pressures. However, in the electrochemical synthesis of methanol from methane, FTS is not directly employed; instead, this method seeks to convert methane directly into methanol using electrochemical cells under milder conditions. Despite its potential advantages, such as lower operating pressures, electrochemical methanol synthesis faces significant challenges. These include the development of effective catalysts capable of activating inert methane, high energy consumption, catalyst deactivation over time, unwanted by-products, and economic feasibility concerns. These drawbacks hinder the widespread adoption of electrochemical methods compared to traditional FTS processes.

Recent research has explored various mild oxidation methods such as biocatalysis, photocatalysis, and electrocatalysis. Biocatalysis operates under mild conditions (ambient temperature and pressure), reducing energy costs and providing high selectivity for methane conversion. However, it struggles with limited efficiency and scalability due to enzyme stability and activity issues over time. Photocatalysis uses light energy to drive methane oxidation, offering low energy requirements and the advantage of operating under ambient conditions. Despite these benefits, it faces challenges in achieving high conversion rates and yields, and photocatalysts may degrade or lose activity over time.

Accordingly, one object of the present disclosure is to develop a method for producing methanol from methane via partial oxidation in a fuel cell at room temperature, enhancing yield efficiencies and offering a more economically competitive solution for reducing methane emissions.

SUMMARY

According to a first aspect, the present disclosure relates to a method of electrochemically forming methanol. In some embodiments, the method includes applying a voltage to a fuel cell that includes an anode chamber including an anode that includes a catalyst which includes carbon-doped $\gamma\text{-Fe}_2\text{O}_3$ nanoparticles disposed on a graphite felt support and an anode solution including water and methane, a cathode chamber including a cathode and a cathode solution including water, and a proton exchange membrane separating the anode chamber and the cathode chamber. In some embodiments, the method includes supplying methane to the anode. In some embodiments, the method further includes collecting methanol from the anode solution.

In some embodiments, the carbon-doped $\gamma\text{-Fe}_2\text{O}_3$ nanoparticles are crystalline by Powder X-Ray diffraction (PXRD).

In some embodiments, the carbon-doped $\gamma\text{-Fe}_2\text{O}_3$ nanoparticles are substantially spherical and have a mean particle size of 10 to 1000 nanometers (nm).

In some embodiments, the carbon-doped $\gamma\text{-Fe}_2\text{O}_3$ nanoparticles include 0.1 to 25 atoms % carbon based on a total number of atoms in the carbon-doped $\gamma\text{-Fe}_2\text{O}_3$ nanoparticles.

In some embodiments, the catalyst is formed by heating iron (III) acetate to 300 to 800° C. under flowing nitrogen gas.

In some embodiments, the anode is formed by a method including the following steps: mixing the catalyst with a liquid perfluoropolymer solution and aqueous ethanol to form a deposition solution, and depositing the deposition solution onto a graphite felt substrate. In some embodiments, the anode has a catalyst loading of 0.1 to 0.35 milligrams per square centimeter ($mg/cm^2$).

In some embodiments, the liquid perfluoropolymer solution includes a polytetrafluoroethylene/perfluorosulfonic acid copolymer dispersed in a solution including water and an alcohol having 1 to 5 carbon atoms.

In some embodiments, the deposition solution has a water to ethanol ratio of 0.25:1 to 1:1 by volume.

In some embodiments, the proton exchange membrane is a sulfonated perfluoropolymer proton exchange membrane having an equivalent weight of 1000 to 1250 g perfluoropolymer per mol of sulfonate groups.

In some embodiments, the proton exchange membrane is an extrusion cast membrane having a thickness of 150 to 200 micrometer (μm).

In some embodiments, the method of present disclosure results in a methanol production rate of 0.1 to 0.25 mol methanol per gram of catalyst per hour.

In some embodiments, the methane is supplied to the anode chamber at a pressure of 10 to 55 pound per square inch (psi).

In some embodiments, the method of present disclosure results in a methanol selectivity greater than 50% to 99% based on a total amount of methane converted by the method of the present disclosure.

In some embodiments, the method of present disclosure results in a methane conversion of 1% to 25% based on a total amount of methane provided to the anode chamber.

In some embodiments, the anode solution is substantially free of hydrogen peroxide.

In some embodiments, the anode solution further includes an electrolyte which is at least one selected from the group consisting of an alkali metal hydroxide, an alkali metal carbonate, an alkaline earth metal hydroxide, and an alkaline earth metal carbonate.

In some embodiments, the method of present disclosure is performed at a temperature of 15 to 35° C.

In some embodiments, the voltage is 0.25 to 2.0 V vs standard hydrogen electrode.

In some embodiments, the voltage is provided at a current density of 1 to 15 milliampere per square centimeter (mA/cm$^2$).

In some embodiments, the methane is supplied continuously to the anode chamber and the anode solution is continuously circulated while the method is being performed.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
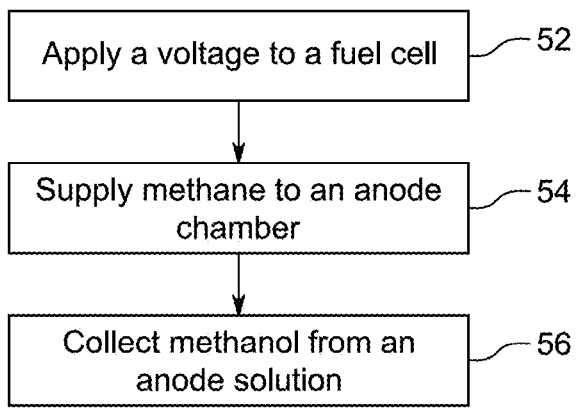
FIG. 1A is a schematic diagram of a flow chart of a method of collecting methanol from an anode solution, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferebetween 5%, and any values therebetween.

As used herein, the term 'catalyst' refers to a substance that facilitates the chemical conversion of reactants into products by providing an alternative reaction pathway with a lower activation energy.

As used herein, the term 'fuel cell' refers to an electrochemical device that converts the chemical energy of a fuel, such as methane ($CH_4$), directly into electrical energy through an electrochemical reaction. A fuel cell includes two main components: an anode and a cathode, which may be separated by an electrolyte or proton exchange membrane (PEM). The anode facilitates the oxidation of the fuel, generating electrons and protons, while the cathode facilitates the reduction reaction, often involving an oxidant such as oxygen ($O_2$). The electrons flow through an external circuit, generating electrical current, while the protons pass through the electrolyte to the cathode, where they participate in the reduction reaction As used herein, the term 'electrochemical reaction' refers to a chemical process that involves the transfer of electrons between substances, typically occurring at the interfaces of an electrode and an electrolyte. This type of reaction takes place in an electrochemical cell, where oxidation and reduction reactions occur simultaneously. During an electrochemical reaction, electrons are transferred from the oxidized species (the anode) to the reduced species (the cathode) through an external circuit, while ions migrate through the electrolyte to maintain charge neutrality.

As used herein, the term 'Fischer-Tropsch syntheses' refers to a chemical process that converts a mixture of carbon monoxide (CO) and hydrogen ($H_2$) into liquid hydrocarbons, typically using a metal catalyst such as iron or cobalt. This process operates under high temperature and pressure conditions to produce a range of hydrocarbon products, including alkanes, alkenes, and alcohols, which can be further refined into fuels and chemicals. The Fischer-Tropsch synthesis is a key technology in converting syngas (a mixture of CO and $H_2$) into synthetic fuels and valuable chemical feedstocks.

According to a first aspect, the present disclosure relates to a method of electrochemically forming methanol from methane. The method of the present disclosure may be advantageous for operating under more moderate conditions, having a higher energy efficiency, having a higher yield of methanol, or some combination of these when compared to a Fischer-Tropsch synthesis method. The method of the present disclosure may be advantageous for having improved reactant efficiency, having improved scalability, having improved reaction and/or product control, or some combination of these.

FIG. 1A illustrates a schematic flow chart of a method 50 of producing methanol from methane. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes applying a voltage to a fuel cell. In some embodiments, the fuel cell includes an anode chamber, which includes an anode including a catalyst disposed on a support and an anode solution. In some embodiments, the anode solution includes water. In some embodiments, the anode solution includes methane. In some embodiments, the anode solution includes both water and methane.

In some embodiments, the catalyst includes carbon-doped $Fe_2O_3$ nanoparticles. In some embodiments, the catalyst may further include a secondary catalyst. In general, the secondary catalyst can be any suitable catalyst known to have activity in converting methane to methanol. Examples of suitable secondary catalysts include, but are not limited to noble metals like platinum or palladium, copper-based catalysts (which may optionally include a promoter such as zinc or aluminum), nickel in various forms, or transition metal oxides like cerium oxides, cobalt oxides, manganese oxides, vanadium oxides, or combinations of these. In the context of the present invention, a catalyst particularly denotes a material that accelerates the electrochemical oxidation of methane ($CH_4$) to methanol ($CH_3OH$) within the fuel cell. In some embodiments, the catalyst operates by a mechanism involving generating hydroxyl radicals. These hydroxyl radicals may be intermediates in the oxidation process.

In some embodiments, the electrochemical method is performed at room temperature, preferably at about 15 to 35° C.

In some embodiments, the carbon-doped $Fe_2O_3$ nanoparticles are crystalline by Powder X-Ray diffraction (PXRD). In some embodiments, the carbon-doped $Fe_2O_3$ are amorphous. In some embodiments, the carbon-doped $Fe_2O_3$ nanoparticles comprise a crystalline portion and an amorphous portion. In some embodiments, the crystalline portion and the amorphous portion coexist in a single carbon-doped $Fe_2O_3$ nanoparticle. $Fe_2O_3$ may exist in various forms, for example, $\alpha$-$Fe_2O_3$ (hematite), $\beta$—$Fe_2O_3$, $\gamma$-$Fe_2O_3$ (maghemite), and $\epsilon$—$Fe_2O_3$. In general, the carbon-doped $Fe_2O_3$ nanoparticles may exist in any suitable phase or combination of phases of $Fe_2O_3$. In some embodiments, the carbon-doped $Fe_2O_3$ nanoparticles comprise $\gamma$-$Fe_2O_3$. In some embodiments, the carbon-doped $Fe_2O_3$ nanoparticles are substantially free of other phases of $Fe_2O_3$. In some embodiments, the carbon-doped $Fe_2O_3$ nanoparticles comprise a non-$Fe_2O_3$ iron oxide (i.e., an iron oxide that is not $Fe_2O_3$). Examples of such non-$Fe_2O_3$ iron oxides include, but are not limited to FeO, $Fe_3O_4$ (magnetite), $Fe_4O_5$, $Fe_5O_6$, $Fe_5O_7$, $Fe_{25}O_{32}$, $Fe_{13}O_{19}$, and/or combinations thereof. In a preferred embodiment, the iron oxide is predominantly $\gamma$-$Fe_2O_3$. That is, the carbon-doped $Fe_2O_3$ nanoparticles comprise greater than 50 wt. % $\gamma$-$Fe_2O_3$ based on a total weight of the carbon-doped $Fe_2O_3$ nanoparticles.

In some embodiments, the carbon-doped $\gamma$-$Fe_2O_3$ nanoparticles include 0.1 to 25 atom %, preferably 0.25 to 20 atom %, preferably 0.50 to 15 atom %, preferably 0.75 to 12.5 atom %, preferably 1.0 to 10.0 atom %, preferably 1.25 to 9.5 atom %, preferably 1.50 to 9.0 atom % carbon based on the total number of atoms in the carbon-doped $\gamma$-$Fe_2O_3$ nanoparticles. In some embodiments, the carbon-doped $\gamma$-$Fe_2O_3$ nanoparticles include 1.75 atom % carbon, or 2.0 atom % carbon, or 2.25 atom % carbon, or 2.50 atom % carbon, or 2.75 atom % carbon, or 3.0 atom % carbon, or 3.25 atom % carbon, or 3.5 atom % carbon, or 3.75 atom % carbon, or 4.0 atom % carbon, or 4.25 atom % carbon, or 4.5 atom % carbon, or 4.75 atom % carbon, or 5.0 atom % carbon, or 5.25 atom % carbon, or 5.5 atom % carbon, or 5.75 atom % carbon, or 6.0 atom % carbon, or 6.25 atom % carbon, or 6.5 atom % carbon, or 6.75 atom % carbon, or 7.0 atom % carbon, or 7.25 atom % carbon, or 7.5 atom % carbon, or 7.75 atom % carbon, or 8.0 atom % carbon, or 8.25 atom % carbon, or 8.5 atom % carbon, or 8.75 atom % carbon, or 9.0 atom % carbon, or 9.25 atom % carbon, or 9.5 atom % carbon, based on the total number of atoms in the carbon-doped $\gamma$-$Fe_2O_3$ nanoparticles. In general, the carbon can be present in any suitable form in the carbon-doped $\gamma$-$Fe_2O_3$ nanoparticles. In some embodiments, the carbon is present as interstitial dopant atoms in the $\gamma$-$Fe_2O_3$ crystal structure. In some embodiments, the caron is present as clusters within the $\gamma$-$Fe_2O_3$ crystal structure. In some embodiments, the carbon is present as an iron carbide phase associated with the carbon-doped 7-$Fe_2O_3$ nanoparticles. Such an association may be through the formation of a nanocomposite (e.g., both the iron carbide and $\gamma$-$Fe_2O_3$ being present in the same particle), the iron carbide being present on a surface of the carbon-doped $\gamma$-$Fe_2O_3$ nanoparticles (e.g. as separate particles or as a coating or partial coating), the carbon-doped $\gamma$-$Fe_2O_3$ nanoparticles being present on a surface of the iron carbide, or the like. In general, the iron carbide can be any suitable iron carbide. Examples of iron carbides include, but are not limited to $Fe_2C$ and $Fe_3C$.

In general, the carbon-doped $\gamma$-$Fe_2O_3$ nanoparticles can be any shape known to one of ordinary skill in the art. Examples of suitable shapes the carbon-doped $\gamma$-$Fe_2O_3$ nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For carbon-doped $\gamma$-$Fe_2O_3$ nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires. In some embodiments, the carbon-doped $\gamma$-$Fe_2O_3$ nanoparticles not nanwires.

In some embodiments, the carbon-doped $\gamma$-$Fe_2O_3$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of carbon-doped $\gamma$-$Fe_2O_3$ nanoparticles having a different shape. As used herein, the term "non-uniform shape" refers to an average consistent shape that differs by more than 10% of the distribution of carbon-doped $\gamma$-$Fe_2O_3$ nanoparticles having a different shape. In one embodiment, the shape is uniform and at least 90% of the carbon-doped $\gamma$-$Fe_2O_3$ nanoparticles are spherical or substantially circular, and less than 10% are polygonal. In another embodiment, the shape is non-uniform and less than 90% of the carbon-doped $\gamma$-$Fe_2O_3$ nanoparticles are spherical or substantially circular, and greater than 10% are polygonal.

In some embodiments, the carbon-doped $\gamma$-$Fe_2O_3$ nanoparticles have a mean particle size of 10 to 1000 nanometers (nm), preferably 20 to 950 nm, preferably 30 to 900 nm, preferably 40 to 850 nm, preferably 50 to 800 nm, preferably 60 to 750 nm, preferably 70 to 700 nm, preferably 80 to 650 nm, preferably 90 to 600 nm, preferably 100 to 500 nm. In embodiments where the carbon-doped $\gamma$-$Fe_2O_3$ nanoparticles are spherical, the particle size may refer to a particle diameter. In embodiments where the carbon-doped $\gamma$-$Fe_2O_3$ nanoparticles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the carbon-doped $\gamma$-$Fe_2O_3$ nanoparticles have an anisotropic shape such as nanorods, the particle size may refer to a length of the nanorod, a width of the nanorod, or an average of the length and width of the nanorod. In some embodiments in which the carbon-doped $\gamma$-$Fe_2O_3$ nanoparticles have non-spherical shapes, the particle size refers to the diameter of a sphere having an equivalent volume as the particle. In some embodiments in which the carbon-doped $\gamma$-$Fe_2O_3$ nanoparticles have non-spherical shapes, the particle size refers to the diameter of a sphere having an equivalent diffusion coefficient as the particle.

In some embodiments, the carbon-doped $\gamma$-$Fe_2O_3$ nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the carbon-doped $\gamma$-$Fe_2O_3$ nanoparticles of the present disclosure are monodisperse having a particle size distribution ranging from 80% of the average particle size to 120% of the average particle size, preferably 90-110%, preferably 95-105% of the average particle size. In some embodiments, the carbon-doped $\gamma$-$Fe_2O_3$ nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the carbon-doped $\gamma$-$Fe_2O_3$ nanoparticles are formed by heating an iron carboxylate precursor under an inert atmosphere. In general, the iron carboxylate precursor can be any suitable iron and carboxylate-containing material. Examples of suitable iron carboxylate precursors include, but are not limited to iron (III) acetate, iron (II) acetate, iron (III) oxalate, iron (II) oxalate, iron stearate, tris(acetylacetonato) iron(III) ("Fe(acac)"), iron citrate or a salt thereof, and the like. In some embodiments, the iron carboxylate precursor is iron (III) acetate. In some embodiments, the iron carboxylate precursor is iron (III) oxalate.

In general, an inert atmosphere may be provided by either a vacuum or by an inert gas such as nitrogen, helium, argon, neon, or other suitable inert gas or mixture thereof. The inert atmosphere may be static or may have a flow of one or more gases. In some embodiments, the inert atmosphere is provided by flowing nitrogen.

In some embodiments, the iron carboxylate precursor is heated to 300 to 800° C., preferably 325 to 725° C., preferably 350 to 750° C., preferably 375 to 725° C., preferably 400 to 700° C. In some embodiments, the iron carboxylate precursor is heated to 425° C. In some embodiments, the iron carboxylate precursor is heated to 450° C. In some embodiments, the iron carboxylate precursor is heated to 475° C. In some embodiments, the iron carboxylate precursor is heated to 500° C. In some embodiments, the iron carboxylate precursor is heated to 525° C. In some embodiments, the iron carboxylate precursor is heated to 550° C. In some embodiments, the iron carboxylate precursor is heated to 575° C. In some embodiments, the iron carboxylate precursor is heated to 600° C. In some embodiments, the iron carboxylate precursor is heated to 625° C. In some embodiments, the iron carboxylate precursor is heated to 650° C. In some embodiments, the iron carboxylate precursor is heated to 675° C. In some embodiments, the iron carboxylate precursor is heated for 1 to 12 hours, preferably 2 to 10 hours, preferably 3 to 9 hours, preferably 4 to 8 hours, preferably 5 to 7 hours, preferably 6 hours.

In some embodiments, the catalyst comprises a carbon nanomaterial. In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In some embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In some embodiments, the graphene is functionalized graphene. Functionalized graphene is distinguished from pristine graphene by the presence of functional groups on the surface or edge of the graphene that contain elements other than carbon and hydrogen. In some embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In some embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In some embodiments, mixtures of types of particles are used.

In some embodiments, the carbon nanomaterial is present in the form of sheets having a mean thickness of 50 to 500 nm, preferably 60 to 475 nm, preferably 75 to 450 nm, preferably 100 to 425 nm, preferably 110 to 400 nm, preferably 125 to 375 nm, preferably 150 to 350 nm and a mean width of 500 to 5000 nm, preferably 550 to 4750 nm, preferably 600 to 4500 nm, preferably 650 to 4250 nm, preferably 700 to 4000 nm, preferably 750 to 3900 nm, preferably 800 to 3800 nm, preferably 850 to 3700 nm, preferably 900 to 3600 nm, preferably 950 to 3500 nm, preferably 1000 to 3400 nm.

In some embodiments, the sheets have a monodisperse thickness, having a coefficient of variation or relative standard deviation, expressed as a percentage and defined as the ratio of the sheet thickness standard deviation (a) to the sheet thickness mean (p), multiplied by 100%, of less than 25%, preferably less than 10%, preferably less than 8%, preferably less than 6%, preferably less than 5%. In a preferred embodiment, the sheets have a monodisperse thickness, having a size distribution ranging from 80% of the average thickness to 120% of the average thickness, preferably 85 to 115%, preferably 90 to 110% of the average thickness. In another embodiment, the sheets do not have a monodisperse thickness. In some embodiments, the sheets have a monodisperse diameter, having a coefficient of variation or relative standard deviation, expressed as a percentage and defined as the ratio of the sheet diameter standard deviation (a) to the sheet diameter mean (p), multiplied by 100%, of less than 25%, preferably less than 10%, preferably less than 8%, preferably less than 6%, preferably less than 5%. In a preferred embodiment, the sheets have a monodisperse diameter, having a size distribution ranging from 80% of the average diameter to 120% of the average diameter, preferably 85 to 115%, preferably 90 to 110% of the average diameter. In another embodiment, the sheets do not have a monodisperse diameter.

In some embodiments, the carbon nanomaterial is associated with the carbon-doped 7-$Fe_2O_3$ nanoparticles. Such an association may be through the formation of a nanocomposite, the carbon nanomaterial being present on a surface of the carbon-doped γ-$Fe_2O_3$ nanoparticles, the carbon-doped γ-$Fe_2O_3$ nanoparticles being present on a surface of the carbon nanomaterial, or the like. In some embodiments, the carbon nanomaterial is not associated with the carbon-doped 7-$Fe_2O_3$ nanoparticles.

In some embodiments, the catalyst does not comprise a carbon nanomaterial.

In some embodiments, the catalyst is disposed on a catalyst support. In general, the support can be any suitable support known to one of ordinary skill in the art. Examples of suitable such supports include, but are not limited to carbon paper, carbon cloth, metal foams (made from materials like nickel or stainless steel), conductive polymers such as polyaniline or polypyrrole, and the like. In some embodiments, the support is a graphite felt support.

In some embodiments, the anode solution includes water. In some embodiments, the anode solution includes methane. In some embodiments, the anode solution includes both water and methane. In some embodiments, the anode solution comprises methanol or a methanol precursor, such as formaldehyde. The inclusion of methanol or a methanol precursor can be advantageous for facilitating methanol electrooxidation or improving reaction efficiency. In some embodiments, the anode solution includes an electrolyte. In some embodiments, the anode solution includes an acidic electrolyte. Examples of suitable acidic electrolytes include but are not limited to mineral acids such as hydrochloric acid, sulfuric acid, or phosphoric acid. The inclusion of an acidic electrolyte may be useful for enhancing proton conductivity. In some embodiments, the anode solution includes an alkaline electrolyte. Examples of suitable alkaline electrolytes include but are not limited to hydroxides such as calcium hydroxide, potassium hydroxide, and sodium hydroxide, and carbonates such as calcium carbonate, sodium carbonate, and potassium carbonate. The inclusion of an alkaline electrolyte may be useful for improving catalyst stability and reaction kinetics. In some embodiments, the electrolyte is useful for providing ionic and/or electrical conductivity. In some embodiments, the anode solution is substantially free of hydrogen peroxide.

In some embodiments, the voltage applied to the fuel cell is 0.05 to 2.50 V, preferably 0.10 to 2.40 V, preferably 0.15 to 0.25 V, preferably 0.20 to 2.1 V, preferably 0.25 to 2.0 V, preferably 0.30 to 1.9 V, preferably 0.35 to 1.80 V, preferably 0.45 to 1.70 V, preferably 0.50 to 1.60 V, preferably 0.55 to 1.5 V vs standard hydrogen electrode (SHE). For example, the voltage applied to the fuel cell may be 0.60 V, 0.65 V, 0.70 V, 0.75 V, 0.80 V, 0.85 V, 0.90 V, 0.95 V, 1.00 V, 1.05 V, 1.10 V, 1.15 V, 1.20 V, 1.25 V, 1.30 V, 1.35 V, 1.40 V, or 1.45 V vs SHE. The standard hydrogen electrode (SHE) is used as a reference electrode in fuel cell measurements to provide a consistent and widely accepted baseline for electrochemical potentials. In some embodiments, the fuel cell includes a reference electrode. In general, the reference electrode can be any suitable reference electrode. In some embodiments, the reference electrode is a standard hydrogen electrode. Examples of other suitable reference electrodes which can be used in embodiments include, but are not limited to, a reversible hydrogen electrode (RHE), a calomel electrode, a silver/silver chloride electrode, a saturated calomel electrode (SCE), and a mercury/mercurous chloride electrode.

In some embodiments, the voltage is applied at a current density of 1 to 15 milliamperes per square centimeter (mA/$cm^2$), preferably 1.5 to 14.5 mA/$cm^2$, preferably 2 to 14 mA/$cm^2$, preferably 2.5 to 13.5 mA/$cm^2$, preferably 3 to 13 mA/$cm^2$, preferably 3.5 to 12.5 mA/$cm^2$, preferably 4 to 12 mA/$cm^2$, preferably 4.5 to 11.5 mA/$cm^2$, preferably 5 to 10 mA/$cm^2$. For example, in some embodiments, the current density may be 5.5 mA/$cm^2$, 6 mA/$cm^2$, 6.5 mA/$cm^2$, 7 mA/$cm^2$, 7.5 mA/$cm^2$, 8 mA/$cm^2$, 8.5 mA/$cm^2$, 9 mA/$cm^2$, or 9.5 mA/$cm^2$.

In some embodiments, the fuel cell comprises a cathode chamber. In some embodiments, the cathode chamber includes a cathode and a cathode solution. In some embodiments, the cathode solution comprises water.

In some embodiments, the fuel cell comprises a proton exchange membrane (PEM). In some embodiments, the PEM may be disposed in the fuel cell such that the PEM separates the anode chamber and the cathode chamber. In some embodiments, the proton exchange membrane comprises a sulfonated perfluoropolymer. In some embodiments, the sulfonated perfluoropolymer has an equivalent weight of 1000 to 1250 g, preferably 1025 to 1225 g, preferably 1050 to 1200 g, preferably 1075 to 1175 g, preferably 1100 to 1150 g perfluoropolymer per mol of sulfonate groups. In some embodiments, the proton exchange membrane is an extrusion cast membrane. In some embodiments, the proton exchange membrane has a thickness of 50 to 500 micrometers (μm), preferably 75 to 400 μm, preferably 100 to 300 μm, preferably 125 to 250 μm, preferably 150 to 200 μm, preferably 175 to 190 μm.

At step 54, the method 50 includes supplying methane to the anode. In general, the methane can be supplied at any suitable pressure. Preferably, the methane is supplied at a pressure which does not cause damage to other features and elements of the fuel cell. In general, such other features and elements of the fuel cell can be designed to accommodate a suitable pressure at which the methane can be supplied. In some embodiments, the methane is supplied to the anode chamber at a pressure of 10 to 55 pound per square inch (psi), preferably 12.5 to 50 psi, preferably 15 to 45 psi, preferably 17.5 to 42.5 psi, preferably 20 to 40 psi, preferably 21 to 39 psi, preferably 22 to 38 psi, preferably 23 to 37 psi, preferably 24 to 36 psi, preferably 25 to 35 psi, preferably 26 to 34 psi, preferably 27 to 33 psi, preferably 28 to 32 psi, preferably 29 to 31 psi, preferably 30 psi. A pressure of methane in this range may be advantageous for controlling a gas flow, ensuring compatibility with other components of the fuel cell, and/or ensuring that it is adequately distributed across the anode surface. Proper distribution across the anode surface may be advantageous for increasing or maximizing the contact between methane and the catalyst. Such enhanced contact may enhance the reaction efficiency and/or overall fuel cell performance. In some embodiments, the methane is supplied continuously to the anode chamber. In some embodiments, the anode solution is continuously circulated while the method is being performed. Methane may be continuously supplied to the anode chamber to ensure a steady flow of reactant throughout the electrochemical process. This continuous supply may be advantageous for for maintaining consistent reaction rates and/or increasing the efficiency of methane oxidation. In some embodiments, the anode solution is continuously circulated. This circulation may be advantageous for helping or ensuring an even distribution of the methane across the anode surface and/or maintain uniform contact with the catalyst. This circulation may also assist in removing reaction by-products and/or heat, preventing localized build-up that could hinder the reaction or damage the fuel cell components.

In some embodiments, the method results in a methanol selectivity of greater than 50% to 99%, preferably 55 to 98.5%, preferably 60 to 98.0%, preferably 65 to 97.5%, preferably 70 to 97.0%, preferably 72.5 to 96.5%, preferably 75.0 to 96.0%, preferably 77.5 to 95.5%, preferably 80 to 95.0%, preferably 82.5 to 94.5%, preferably 85 to 94.0%, based on the total amount of methane converted by the method.

At step 56, the method 50 includes collecting methanol from the anode solution. Methanol is collected as an oxidative product. In some embodiments, the method has a methanol production rate is 0.1 to 0.25 mol methanol per gram of catalyst per hour (mol·g$^{-1}$·h$^{-1}$), preferably 0.105 to 0.240 mol·g$^{-1}$·h$^{-1}$, preferably 0.110 to 0.235 mol·g$^{-1}$·h$^{-1}$, preferably 0.115 to 0.225 mol·g$^{-1}$·h$^{-1}$, preferably 0.120 to 0.210 mol·g$^{-1}$·h$^{-1}$, preferably 0.125 to 0.200 mol·g$^{-1}$·h$^{-1}$, preferably 0.130 to 0.185 mol·g$^{-1}$·h$^{-1}$, preferably 0.135 to 0.175 mol·g$^{-1}$·h$^{-1}$, preferably 0.140 to 0.165 mol·g$^{-1}$·h$^{-1}$, preferably 0.145 to 0.160 mol·g$^{-1}$·h$^{-1}$, preferably 0.150 to 0.155 mol·g$^{-1}$·h$^{-1}$ preferably 0.153 mol·g$^{-1}$·h$^{-1}$. In some embodiments, the method has a methane conversion of 1% to 25%, preferably 2 to 22.5%, preferably 3 to 20%, preferably 4 to 17.5%, preferably 5 to 15%, based on the total amount of methane provided to the anode chamber. For example, in the some embodiments, the method has a methane conversion of 1.5%, 2.5%, 3.5%, 4.5%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, or 14.5%, based on the total amount of methane provided to the anode chamber.

Figure 1B:
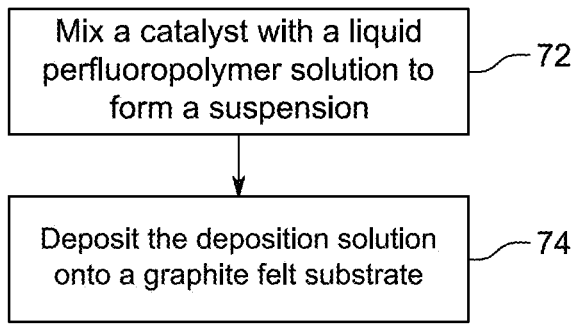
FIG. 1B is a schematic diagram of a flow chart of forming an anode, according to certain embodiments.

FIG. 1B illustrates an exemplary schematic flow chart of a method 70 of forming an anode, according to certain embodiments of the present disclosure. The order in which the method 70 is described is not intended to be construed as a limitation, and any number of the described method steps can be combined to implement the method 70. Additionally, individual steps may be removed or skipped from the method 50 without departing from the spirit and scope of the present disclosure.

At step 72, the method 70 includes mixing the catalyst with a liquid perfluoropolymer solution to form a suspension. In some embodiments, the anode has a catalyst loading of 0.1 to 0.35 milligrams per square centimeter (mg/cm$^2$), preferably 0.11 to 0.34 mg/cm$^2$, preferably 0.12 to 0.33 mg/cm$^2$, preferably 0.13 to 0.32 mg/cm$^2$, preferably 0.14 to 0.31 mg/cm$^2$, preferably 0.15 to 0.30 mg/cm$^2$, preferably 0.16 to 0.29 mg/cm$^2$, preferably 0.17 to 0.28 mg/cm$^2$, preferably 0.18 to 0.27 mg/cm$^2$, preferably 0.19 to 0.26 mg/cm$^2$, preferably 0.20 to 0.25 mg/cm$^2$, preferably 0.21 to 0.24 mg/cm$^2$, preferably 0.215 to 0.23 mg/cm$^2$, preferably 0.22 mg/cm$^2$.

In some embodiments, the liquid perfluoropolymer solution comprises a polytetrafluoroethylene/perfluorosulfonic acid copolymer. In some embodiments, the polytetrafluoroethylene/perfluorosulfonic acid copolymer is Nafion®. In some embodiments, the polytetrafluoroethylene/perfluorosulfonic acid copolymer is present in the liquid perfluoropolymer solution in an amount of 0.25 to 5 wt. %, preferably 0.5 to 4 wt. %, preferably 1.0 to 3 wt. %, preferably 1.25 to 2.5 wt. %, preferably 1.5 to 2.25 wt. %, preferably 1.25 to 2.0 wt. %, preferably 1.5 to 1.75 wt. %, preferably 1.6 to 1.7 wt. %, preferably 1.66 wt. %. In some embodiments, the liquid perfluoropolymer solution comprises an alcohol having 1 to 5 carbon atoms, preferably 1-3 carbon atoms, preferably 2 carbon atoms. In some embodiments, the liquid perfluoropolymer solution comprises ethanol. In some embodiments, the liquid perfluoropolymer solution comprises water. In some embodiments, the liquid perfluoropolymer solution may further comprise polyvinyl alcohol, Polyethylene Glycol (PEG), Polyimide, Conductive Carbon Black.

In some embodiments, the deposition solution has a water to ethanol ratio of 0.25:1 to 1:1, preferably 0.3:1 to 0.9:1, preferably 0.4:1 to 0.8:1, preferably 0.5:1 to 0.7:1, preferably 0.6:1 by volume.

At step 74, the method 70 involves depositing a deposition solution onto the substrate. During deposition, the solution is applied to the substrate through techniques such as spraying, dipping, or coating. As the solvent evaporates or reacts, the desired material, such as a catalyst or active component, may form a thin, uniform layer on the substrate. This thin, uniform layer may be advantageous for improving the overall catalytic activity and performance of the anode in electrochemical reactions, such as by ensuring efficient electron transfer and effective reaction sites.

EXAMPLES

The following examples demonstrate a method of electrochemically forming methanol from methane as described herein. The examples are provided solely for illustration and are not to be construed as limitations of the present disclosure, as many variations thereof are possible without departing from the spirit and scope of the present disclosure.

Example 1: Materials and Method

Methanol, deuterium oxide, ferric acetate, and Nafion® 117 proton exchange membrane purchased from Electro Cell was used as a divider to separate the anode and cathode chamber. All reagents were of analytical reagent grades and used directly as received.

Example 2: Synthesis of C—Fe$_2$O$_3$

About 50 mg of ferric acetate was added to the furnace boat, then the material was calcined under nitrogen for 6 h, under the flow of nitrogen gas after that the C—Fe$_2$O$_3$ was formed, and the catalyst was collected. The above procedure was repeated at different calcination temperatures from 400-700° C.

Example 3: Preparation of Catalyst Electrodes 5.0 mg of iron oxide catalyst, and 40.0 microliter (L) of Nafion solution (1.66 wt %) were dispersed in 600 µL of ethanol and 360 L of water by ultrasonication for 1.0 hr. to form a homogeneous ink. Then, the dispersion was loaded onto a graphite felt electrode substrate with an area of 4.0×3.0 cm$^2$ and followed by drying under ambient conditions. Subsequently, the homogeneously dispersed ink was drop-casted to the graphite felt electrode to achieve a catalyst loading of 0.22 milligrams per square centimeter (mg cm$^{-2}$).

Example 4: Experimental Setup

Figure 2:
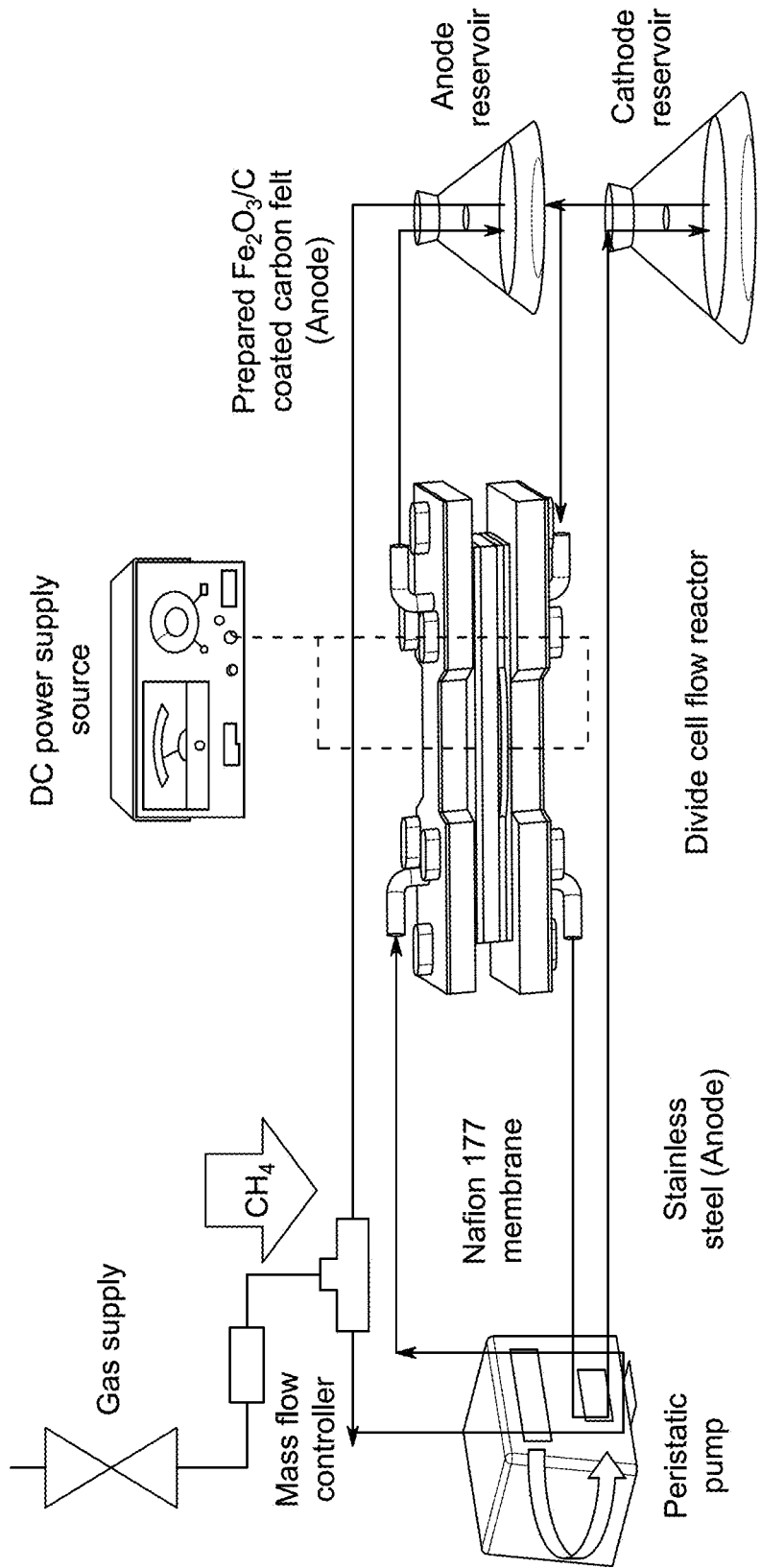
FIG. 2 is a schematic diagram of a flow cell reactor, according to certain embodiments.

The flow cell is shown in FIG. 2. Methane gas (30 pound per square inch (psi)) was supplied to the reactor where water (30 mL each of the two electrolytes) was pumped through in and out of the electrolyte solutions. The catalyst was placed at the anode electrode and the methanol was collected at the oxidative product.

Example 5: Separation Techniques

Gas Chromatography with Flame Ionization Detection was used with a detector temperature of 250° C. and He as the carrier gas was used to separate and quantify methanol. The $^1$H and $^{13}$C spectra were obtained on the Bruker 400 spectrophotometer.

Example 6: Characterization and Fuel Cell Testing

Figure 3A:
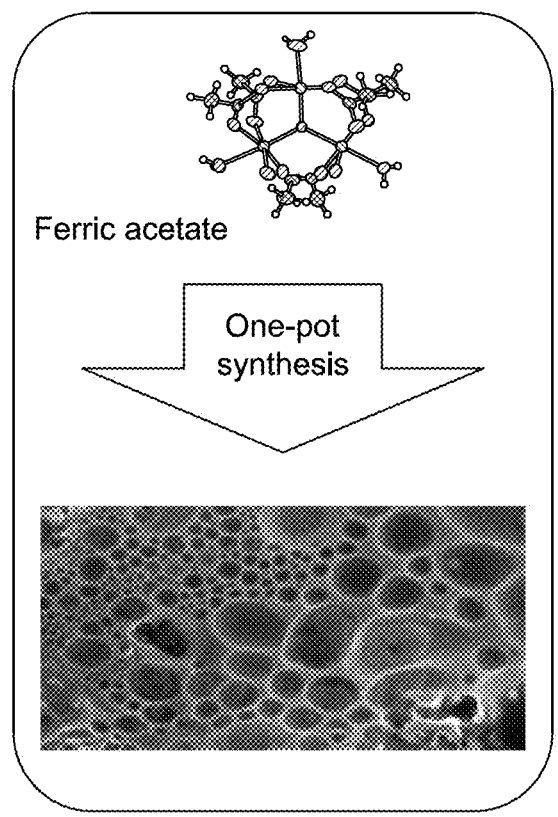
FIG. 3A shows one pot synthesis of $Fe_2O_3$ from ferric acetate, and a scanning electron microscope (SEM) image of $Fe_2O_3$, according to certain embodiments.
Figure 3B:
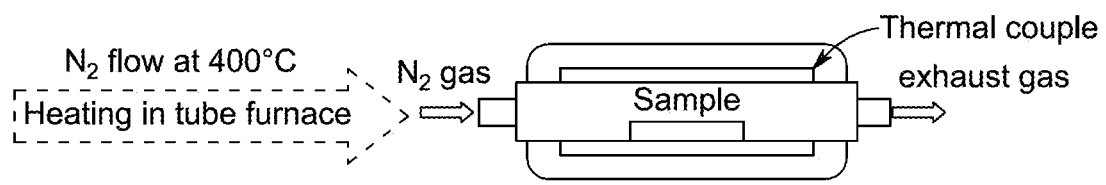
FIG. 3B is a schematic flow chart of synthesis of $Fe_2O_3$ via tube furnace, according to certain embodiments.
Figure 3C:
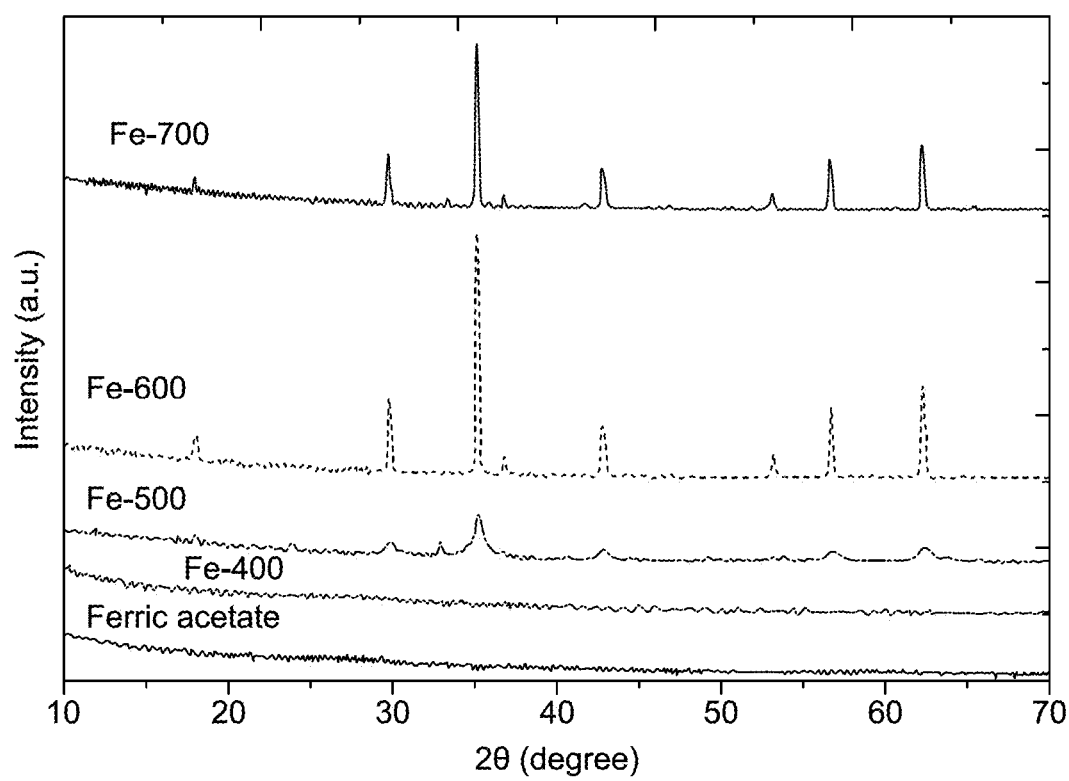
FIG. 3C shows X-ray diffraction pattern (XRD) of iron oxide at different temperatures, according to certain embodiments.
Figure 4:
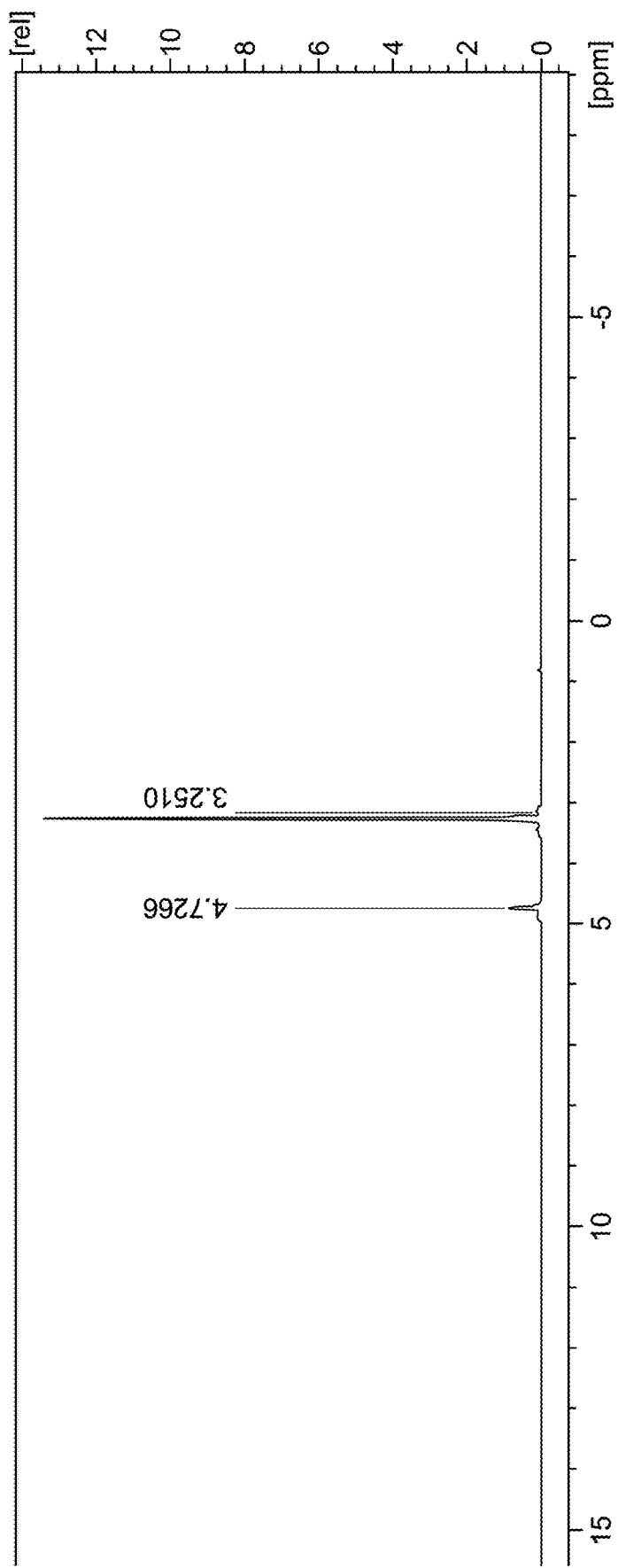
FIG. 4 shows proton nuclear magnetic resonance ($^1H$ NMR) of methanol, according to certain embodiments.
Figure 5:
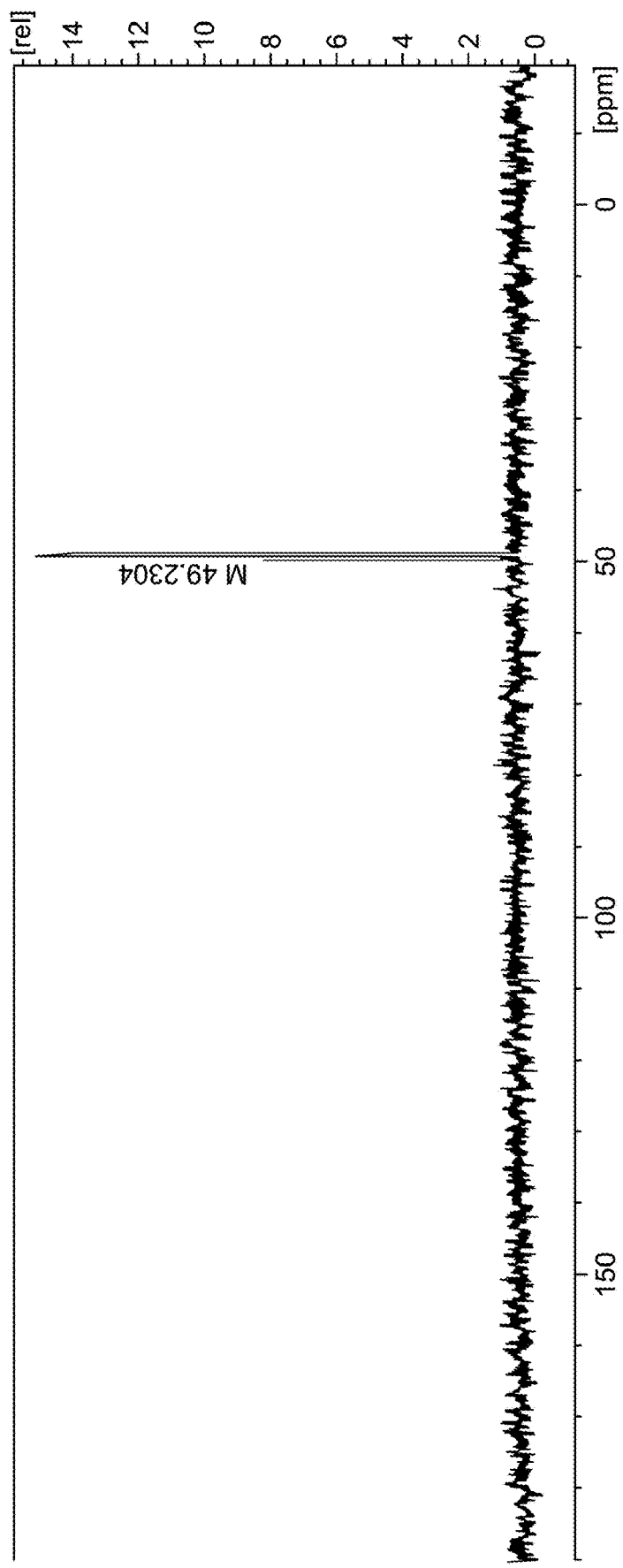
FIG. 5 shows carbon-13 nuclear magnetic resonance ($^{13}C$ NMR) spectra for methanol, according to certain embodiments.

X-Ray diffraction (XRD) and Scanning electron microscopy (SEM) investigated the chemical composition and the structure of the resultant nanoparticles. The results are presented in FIGS. 3A-3C. The proton nuclear magnetic resonance ($^1$H NMR) and Carbon-13 nuclear magnetic resonance ($^{13}$C NMR) spectra for the produced methanol are shown in FIG. 4 and FIG. 5, respectively. The chemical shifts observed in both the $^1$H and $^{13}$C NMR spectra for methanol were compared and found to be consistent with that of the standard. The $^{13}$C NMR spectrum of the sample and the standard both showed only one peak at ~49.0 parts per million (ppm), which corresponds to the carbon attached to the —OH group. Similarly, the $^1$H NMR spectrum shows only one peak each at 3.24 and 3.21 ppm, which corresponds to the —OH group for the sample and the standard respectively. The result is comparable with that obtained by Zhong et. al. whose peak stood at ~3.3 ppm. [M. Zhong et al., Journal of Physical Chemistry C, vol. 125, no. 23, pp. 12713-12720, 2021, incorporated herein by reference in its entirety].

The reaction of methane was identified using gas chromatography-flame ionization detection (GC-FID) where components were separated, and calibration coefficient successfully plotted.

Figure 6:
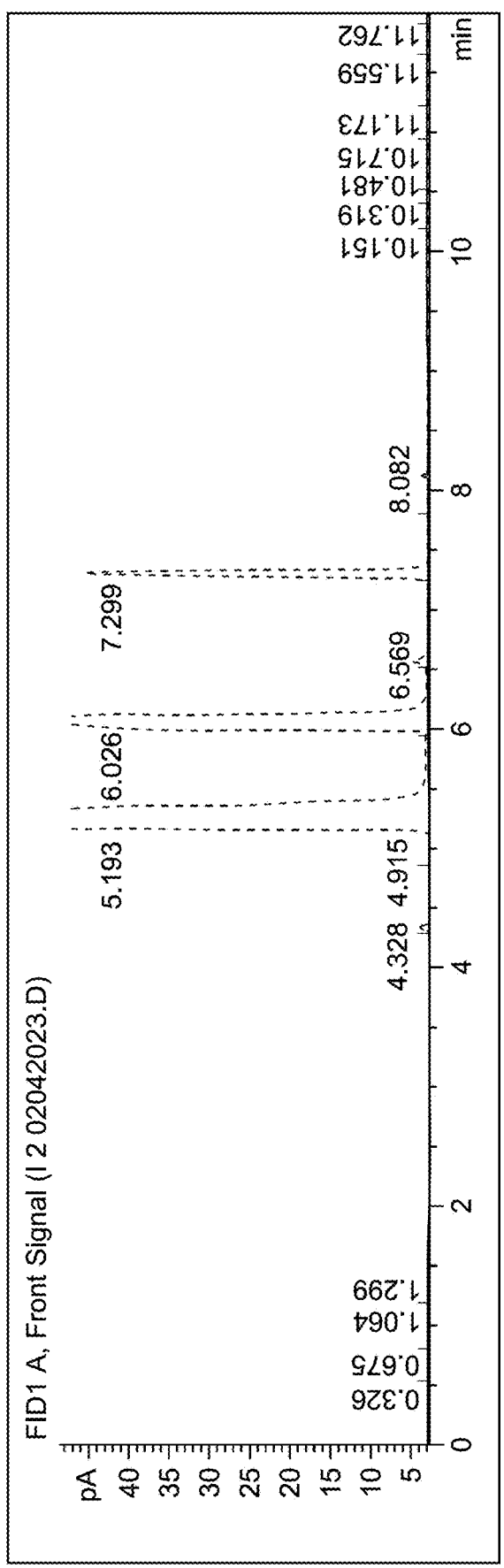
FIG. 6 shows gas chromatography-flame ionization detection (GC-FID) spectra for methanol sample, according to certain embodiment.

The GC result for the sample is shown in FIG. 6. The retention time of methanol in the sample was 5.193 minutes, which was similar to that obtained from the standard sample at 5.173 indicating that the sample is likely to contain the same compound as the standard.

The calibration curve was generated by plotting the peak area of standard solutions of methane at concentrations ranging from 20,000 to 100,000 ppm in GC-FJD. The plot of the calibration curve is shown in FIG. 6. The calibration curve showed excellent linearity over the concentration range tested, with a correlation coefficient of 0.9997. The slope of the curve was 0.2767 and the intercept was 227.58. The amount of methanol formed was determined by plotting a calibration for standard methanol solutions using the equation of the graph.

TABLE 1

Comparison of the methanol yield

| Oxidant | Catalyst | Methanol yield | Reference |
|---|---|---|---|
| $O_2$/CO | Au/H-MOR | 280 mmol g$^{-1}$ hr$^{-1}$ | [W. Wang, et. al., J Am Chem Soc, vol. 145, no. 23, pp. 12928-12934, June 2023, incorporated herein by reference in its entirety] |
| $O_2$ | Rh/ZrO$_2$ | 0.3 mol kg$^{-1}$ hr$^{-1}$ | [Y. Kwon, et. al., J Am Chem Soc, vol. 139, no. 48, pp. 17694-17699, December 2017, incorporated herein by reference in its entirety] |
| $H_2O_2$ | FeN$_4$/GN | 0.47 mol hr$^{-1}$ | [X. Cui, et. al., Chem, vol. 4, no. 8, pp. 1902-1910, 2018, incorporated herein by reference in its entirety] |
| $H_2O$ | Fe$_2$O$_3$ | 0.153 mol g$^{-1}$ hr$^{-1}$ | This work |

The blank measurements were carried out under the same experimental set up to confirm if methanol was produced from the reaction of methane. It was carried out on the same experimental set up and conditions by passing nitrogen gas instead of methane. No peak for methane was observed.

Numerous modifications and variations of the present disclosure are possible in light of the above teachings. It is therefore to be understood that within the scope of the appended claims, the invention may be practiced otherwise than as specifically described herein.

The invention claimed is:

1. A method of electrochemically forming methanol, the method comprising:
   applying a voltage to a fuel cell including an anode chamber including an anode comprising a catalyst disposed on a graphite felt support and an anode solution comprising water and methane,
   a cathode chamber including a cathode and a cathode solution comprising water, and
   a proton exchange membrane separating the anode chamber and the cathode chamber;
   supplying methane to the anode chamber; and
   collecting methanol from the anode solution, wherein
   the catalyst comprises carbon-doped γ-Fe$_2$O$_3$ nanoparticles.

2. The method of claim 1, wherein the carbon-doped γ-Fe$_2$O$_3$ nanoparticles are crystalline by powder X-ray diffraction (PXRD).

3. The method of claim 1, wherein the carbon-doped γ-Fe$_2$O$_3$ nanoparticles are substantially spherical and have a mean particle size of 10 to 1000 nm.

4. The method of claim 1, wherein the carbon-doped γ-Fe$_2$O$_3$ nanoparticles comprise 0.1 to 25 atom % carbon based on a total number of atoms in the carbon-doped γ-Fe$_2$O$_3$ nanoparticles.

5. The method of claim 1, wherein the catalyst is formed by heating iron (III) acetate to 300 to 800° C. under flowing nitrogen gas.

6. The method of claim 1, wherein the anode is formed by
mixing the catalyst with a liquid perfluoropolymer solution and aqueous ethanol to form a deposition solution; and depositing the deposition solution onto a graphite felt substrate, wherein the anode has a catalyst loading of 0.1 to 0.35 mg/cm$^2$.

7. The method of claim 6, wherein the liquid perfluoropolymer solution comprises a polytetrafluoroethylene/perfluorosulfonic acid copolymer dispersed in a solution comprising water and an alcohol having 1 to 5 carbon atoms.

8. The method of claim 6, wherein the deposition solution has a water to ethanol ratio of 0.25:1 to 1:1 by volume.

9. The method of claim 1, wherein the proton exchange membrane is a sulfonated perfluoropolymer proton exchange membrane having an equivalent weight of 1000 to 1250 g perfluoropolymer per mol of sulfonate groups.

10. The method of claim 9, wherein the proton exchange membrane is an extrusion cast membrane having a thickness of 150 to 200 μm.

11. The method of claim 1, having a methanol production rate of 0.1 to 0.25 mol methanol per gram of catalyst per hour.

12. The method of claim 1, wherein the methane is supplied to the anode chamber at a pressure of 10 to 55 psi.

13. The method of claim 1, having a methanol selectivity of greater than 50% to 99% based on a total amount of methane converted by the method.

14. The method of claim 1, having a methane conversion of 1% to 25% based on a total amount of methane provided to the anode chamber.

15. The method of claim 1, wherein the anode solution is substantially free of hydrogen peroxide.

16. The method of claim 1, wherein the anode solution further comprises an electrolyte which is at least one selected from the group consisting of an alkali metal hydroxide, an alkali metal carbonate, an alkaline earth metal hydroxide, and an alkaline earth metal carbonate.

17. The method of claim 1, which is performed at a temperature of 15 to 35° C.

18. The method of claim 1, wherein the voltage is 0.25 to 2.0 V vs standard hydrogen electrode.

19. The method of claim 1, wherein the voltage is provided at a current density of 1 to 15 mA/cm$^2$.

20. The method of claim 1, wherein the methane is supplied continuously to the anode chamber and the anode solution is continuously circulated while the method is being performed.

* * * * *